(12) United States Patent
Luman

(10) Patent No.: US 6,868,227 B2
(45) Date of Patent: Mar. 15, 2005

(54) DIGITAL VIDEO DISK DEVICE RE-CONFIGURATION

(75) Inventor: David J. Luman, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1016 days.

(21) Appl. No.: 09/742,469

(22) Filed: Dec. 20, 2000

(65) Prior Publication Data

US 2002/0076211 A1 Jun. 20, 2002

(51) Int. Cl.[7] .................................................. H04N 5/52
(52) U.S. Cl. .......................... 386/95; 386/125; 710/104
(58) Field of Search ............................ 386/45, 95, 125, 386/126; 369/47.13, 47; 710/10, 104

(56) References Cited

U.S. PATENT DOCUMENTS 6,370,323 B1 * 4/2002 Adolph et al. ............... 386/125
6,392,968 B1 * 5/2002 Kageyama et al. ........ 369/47.13
6,665,765 B1 * 12/2003 Tang et al. .................. 710/104
6,725,260 B1 * 4/2004 Philyaw ........................ 710/10

* cited by examiner

Primary Examiner—Thai Tran
Assistant Examiner—Christopher Onuaku

(57) ABSTRACT

A DVD device comprises a non-volatile memory and a processing system. The non-volatile memory stores a first configuration. The processing system processes a signal from a DVD, and if a reconfiguration code is stored on the DVD, then the processing system detects the reconfiguration code in the signal. If the reconfiguration code is not detected, then the processing system operates based on the first configuration. If the reconfiguration code is detected, then the processing system processes reconfiguration instructions from the signal. The processing system transfers a second configuration to the non-volatile memory based on the reconfiguration instructions. The non-volatile memory stores the second configuration. The processing system operates based on the second configuration in response to the second configuration being stored in the non-volatile memory.

20 Claims, 4 Drawing Sheets

DIGITAL VIDEO DISK DEVICE RECONFIGURATION

BACKGROUND OF THE INVENTION

1. Field of the Invention

The invention is related to the field of digital video disk devices, and in particular, to a digital video disk device that re-configures itself based on instructions on a digital video disk.

2. Statement of the Problem

A Digital Video Disk (DVD) device plays a DVD to produce a video signal for a video display. A popular use for the DVD device is to play movies. The user buys a movie DVD and inserts the DVD into the DVD device. The DVD device reads the DVD to produce a DVD signal. The DVD device converts the DVD signal into a video signal for a television connected to the DVD device. The user may then watch the movie on the television using the many interactive features provided by the DVD device.

The DVD device has an internal non-volatile memory, such as a Read Only Memory (ROM). The DVD device operates based on a configuration that is stored in ROM. The configuration may include parameters for a decoding algorithm that is used to convert the DVD signal into the video signal for the television. The configuration may include parameters for a user interface that is used to present menus and obtain user selections. The configuration may include parameters for a communication interface that is used to communicate over a network with other devices.

The configuration should be distinguished from operating instructions that are stored on the DVD. For example, the DVD typically includes operating instructions that allow the DVD device to construct the screens for the user interface. The operating instructions from the DVD may include titles, chapter breakdowns, viewing options, and other information to assist in playing the DVD. The operating instructions from the DVD affect how that particular DVD is played, but they do not affect how other DVDs are played. The DVD device does not store the operating instructions from the DVD in ROM. In contrast, the configuration is stored in ROM and affects how the DVD device operates for all DVDs.

Periodically, the user may desire to upgrade the configuration of their DVD device. A design defect may also force the user to modify the configuration of their DVD device. Unfortunately, the user cannot conveniently upgrade this configuration because the user must replace the ROM with a new ROM that stores a new configuration. Typically, the user must transport their DVD device to a qualified technician who replaces the old ROM with a new one. Having a technician replace the ROM is a costly and time-consuming way to change the DVD device configuration.

SUMMARY OF THE SOLUTION

The invention helps solve the above problems with a DVD device that that reconfigures itself based on reconfiguration instructions on a digital video disk. To reconfigure their DVD device, the user simply plays a DVD with the reconfiguration instructions. The user does not need to replace the ROM or transport their DVD device to a technician.

The DVD device comprises a non-volatile memory and a processing system. The non-volatile memory stores a first configuration. The processing system processes a signal from a DVD, and if a reconfiguration code is stored on the DVD, then the processing system detects the reconfiguration code in the signal. If the reconfiguration code is not detected, then the processing system operates based on the first configuration. If the reconfiguration code is detected, then the processing system processes reconfiguration instructions from the signal. The processing system transfers a second configuration to the non-volatile memory based on the reconfiguration instructions. The non-volatile memory stores the second configuration. The processing system operates based on the second configuration in response to the second configuration being stored in the non-volatile memory.

In some examples of the invention, the non-volatile memory comprises a flash ROM. In some examples of the invention, the second configuration comprises a different decoding algorithm, communication interface, or user interface than the first configuration. The second configuration may comprise a design defect fix for the first configuration.

In some examples of the invention, the reconfiguration code comprises a device identifier for the second configuration. The processing system then transfers the second configuration to the non-volatile memory if the device identifier includes the digital video disk device. The reconfiguration code may comprise a version identifier for the second configuration. The processing system then transfers the second configuration to the non-volatile memory if the version identifier does include the first configuration. In response to detecting the reconfiguration code, the processing system may obtain a user authorization for reconfiguration, such as a user password.

DESCRIPTION OF THE DRAWINGS

The same reference number represents the same element on all drawings.

DETAILED DESCRIPTION OF THE INVENTION

Figure 1:
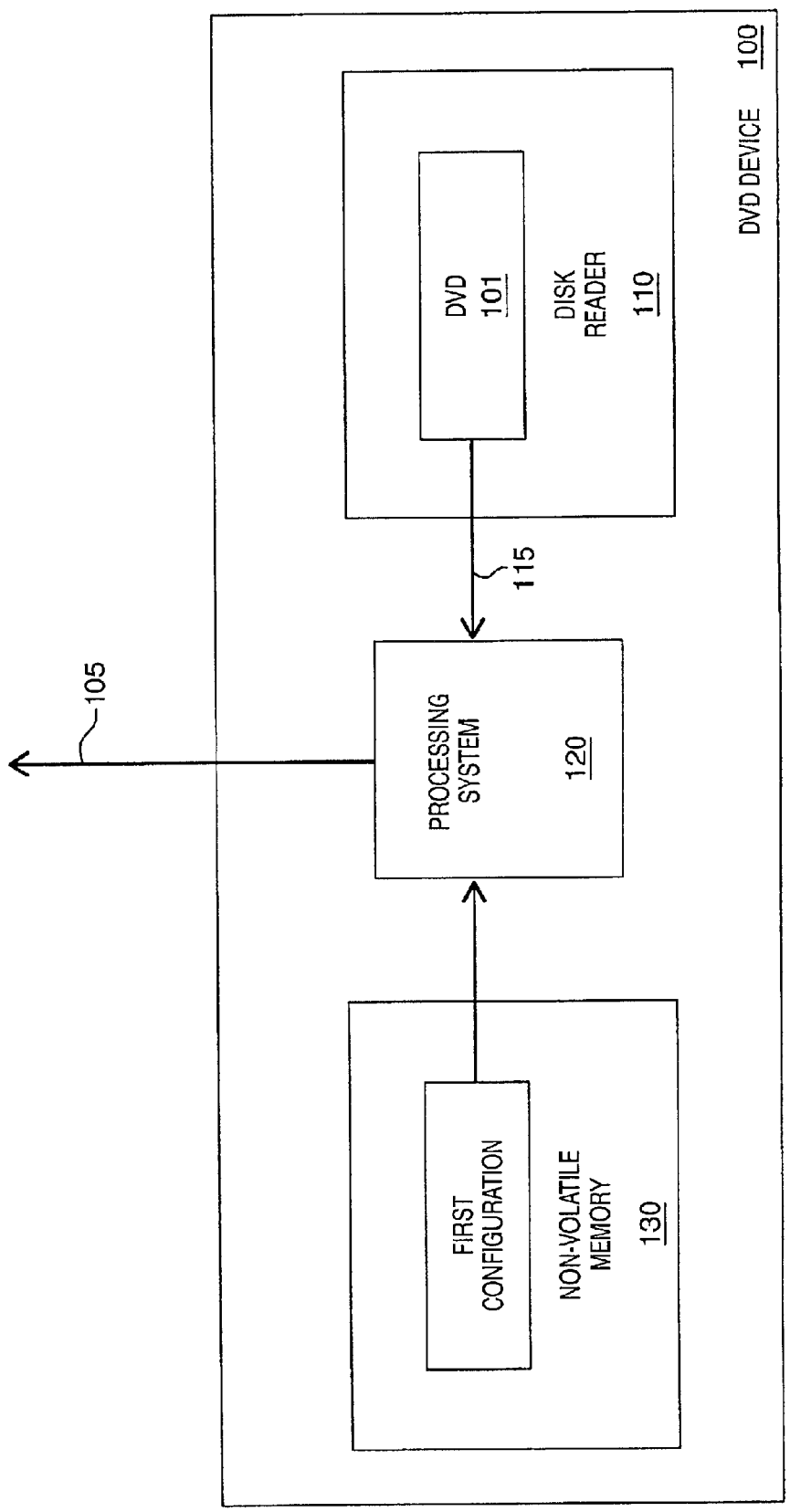
FIG. 1 is a block diagram that illustrates a DVD device in an example of the invention.
Figure 2:
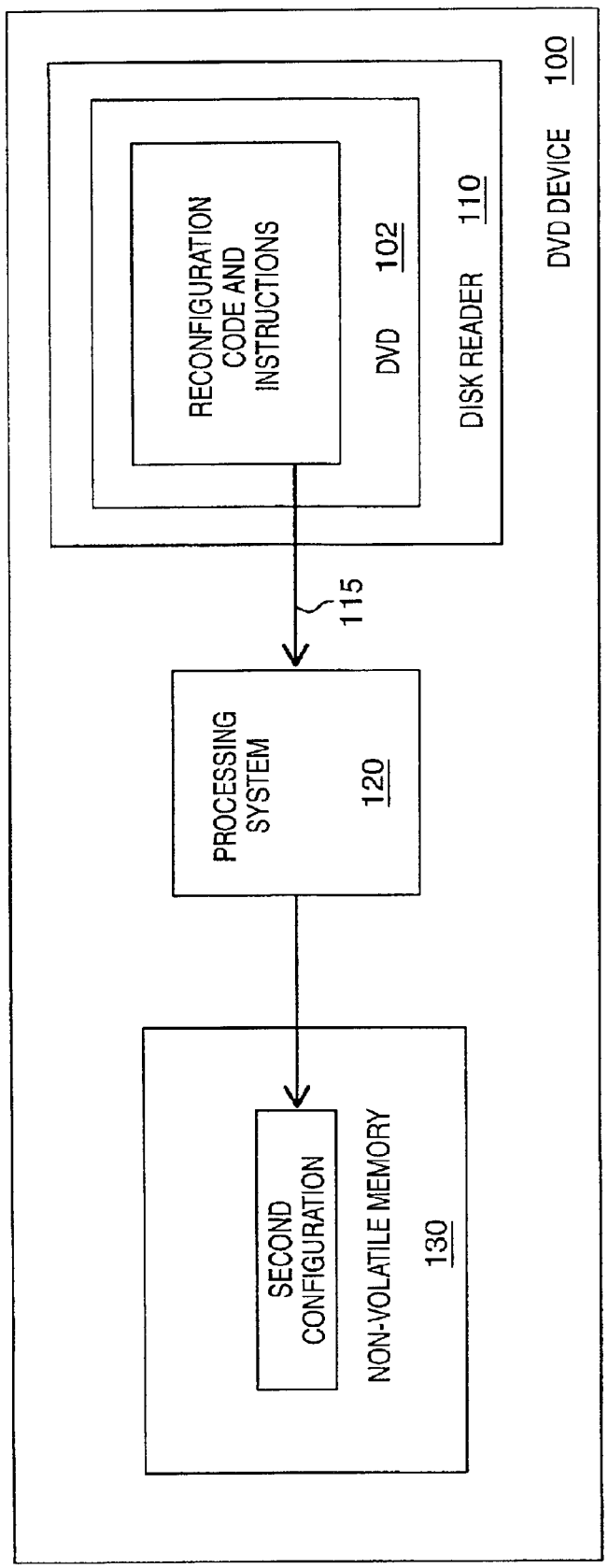
FIG. 2 is a block diagram that illustrates a DVD device in an example of the invention.
Figure 3:
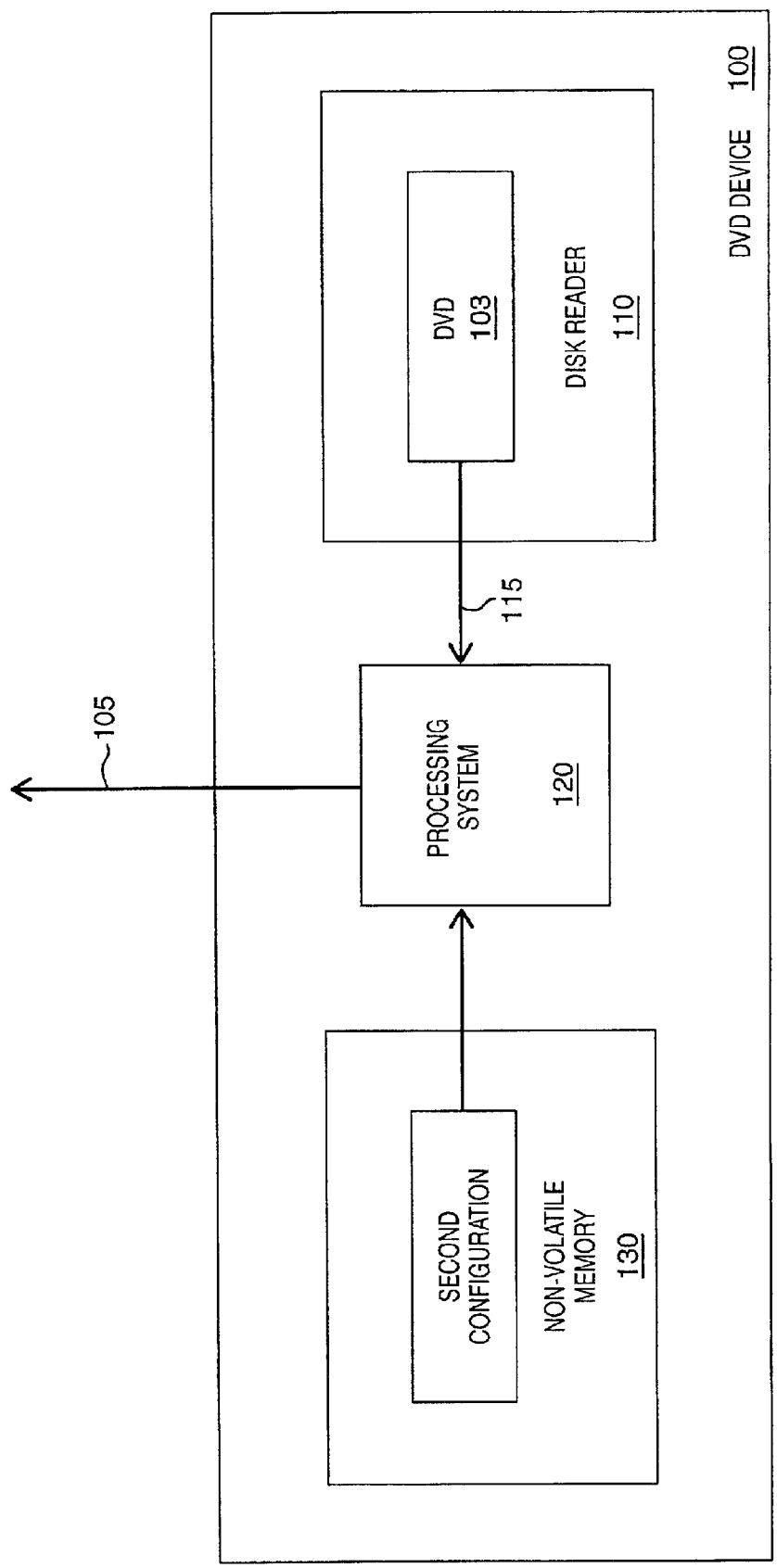
FIG. 3 is a block diagram that illustrates a DVD device in an example of the invention.

DVD Device—FIGS. 1–3

FIG. 1 is a block diagram that illustrates DVD device 100 in an example of the invention. DVD device 100 comprises disk reader 110, processing system 120, and non-volatile memory 130. Non-volatile memory 130 initially stores a first configuration and could be comprised of a flash ROM. Disk reader 110 and non-volatile memory 130 could be comprised of conventional components. Processing system 120 is comprised of circuitry, and aside from modifications to implement the operation of FIG. 4, processing system 120 could be conventional. Based on this description, those skilled in the art will readily appreciate how to adapt well-known DVD devices to create DVD device 100.

Processing system 120 may include a processor that retrieves and executes instructions that are stored on storage media. Some examples of instructions are software and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits and logic circuitry. Those skilled in the art are familiar with instructions, processors, and storage media.

In operation, the user inserts conventional DVD 101 into disk reader 110. Disk reader 110 reads DVD 101 to generate DVD signal 115. Disk reader 110 transfers DVD signal 115 to processing system 120. Processing system 120 converts DVD signal 115 into video signal 105 based on the first configuration. Video signal 105 controls a video display, such as a television.

Processing system 120 operates based on the first configuration that is stored in non-volatile memory 130. The first configuration may include parameters for a decoding algorithm that is used to convert DVD signal 115 into video signal 105. The first configuration may include parameters for a user interface that is used to present menus to the user and obtain selections from the user. The first configuration may include parameters for a communication interface that is used to communicate over a network with other devices. For example, DVD 100 may be connected to a telephone line that it uses to communicate with external systems or networks.

FIG. 2 is a block diagram that further illustrates DVD device 100. To reconfigure DVD device 100, the user inserts DVD 102 into disk reader 110. DVD 102 stores a reconfiguration code and reconfiguration instructions. Disk reader 110 reads DVD 102 to generate DVD signal 115. Disk reader 110 transfers DVD signal 115 to processing system 120. Processing system 120 processes DVD signal 115 to detect the reconfiguration code and process the reconfiguration instructions. Based on the reconfiguration instructions, processing system 120 transfers a second configuration to non-volatile memory 130. Non-volatile memory 130 stores the second configuration.

DVD 102 includes a reconfiguration code and reconfiguration instructions. The reconfiguration code is placed on DVD 102 so it is represented in the initial DVD signal 115 that is first transferred to processing system 120 after DVD 102 is inserted and played. The reconfiguration code should be special enough to signify reconfiguration to processing system 120 as opposed to normal operation. The reconfiguration code may also include a device identifier and version identifier. The device identifier indicates the DVD devices that are suitable for the second configuration. The version identifier indicates the version of the second configuration. If the version identifier indicates that the existing version in non-volatile memory 130 is the same or more current than the version on DVD 102, then there is no reason to replace the existing version.

Processing system 120 detects the reconfiguration code to trigger a reconfiguration sequence. Processing system 120 then checks the device identifier and version identifier indicated by the reconfiguration code to determine if DVD device 100 should be reconfigured. If the device identifier includes DVD device 100, and if the version identifier indicates a new version, then processing system 120 obtains a user authorization to prevent accidental or malicious reconfiguration. DVD device 100 may have a special button for the user to press to provide the user authorization. DVD device 100 may drive a display that prompts the user for the user authorization. If desired a user password may be required as a part of the user authorization. If the user authorization is obtained, then processing system 120 processes DVD signal 115 to recover the reconfiguration instructions. The reconfiguration instructions direct processing system 120 to transfer the second configuration to non-volatile memory 130. The second configuration may comprise only single new operating parameter from the first configuration, or it may comprise a completely new set of operating parameters.

FIG. 3 is a block diagram that further illustrates DVD device 100. The user inserts conventional DVD 103 into disk reader 110. Disk reader 110 reads DVD 103 to generate DVD signal 115. Disk reader 110 transfers DVD signal 115 to processing system 120. Processing system 120 converts DVD signal 115 into video signal 105 based on the second configuration. Video signal 105 controls a video display, such as a television.

In FIG. 3, processing system 120 operates based on the second configuration that is stored in non-volatile memory 130. The second configuration may include new parameters from the first configuration. The new parameters may support a new decoding algorithm, user interface, or communication interface. The second configuration may also include a fix for a design defect in the first configuration. For example, the first configuration might cause processing system 120 to incorrectly calculate dates, and the second configuration could include a patch that allows processing system 120 to correctly calculate dates.

Figure 4:
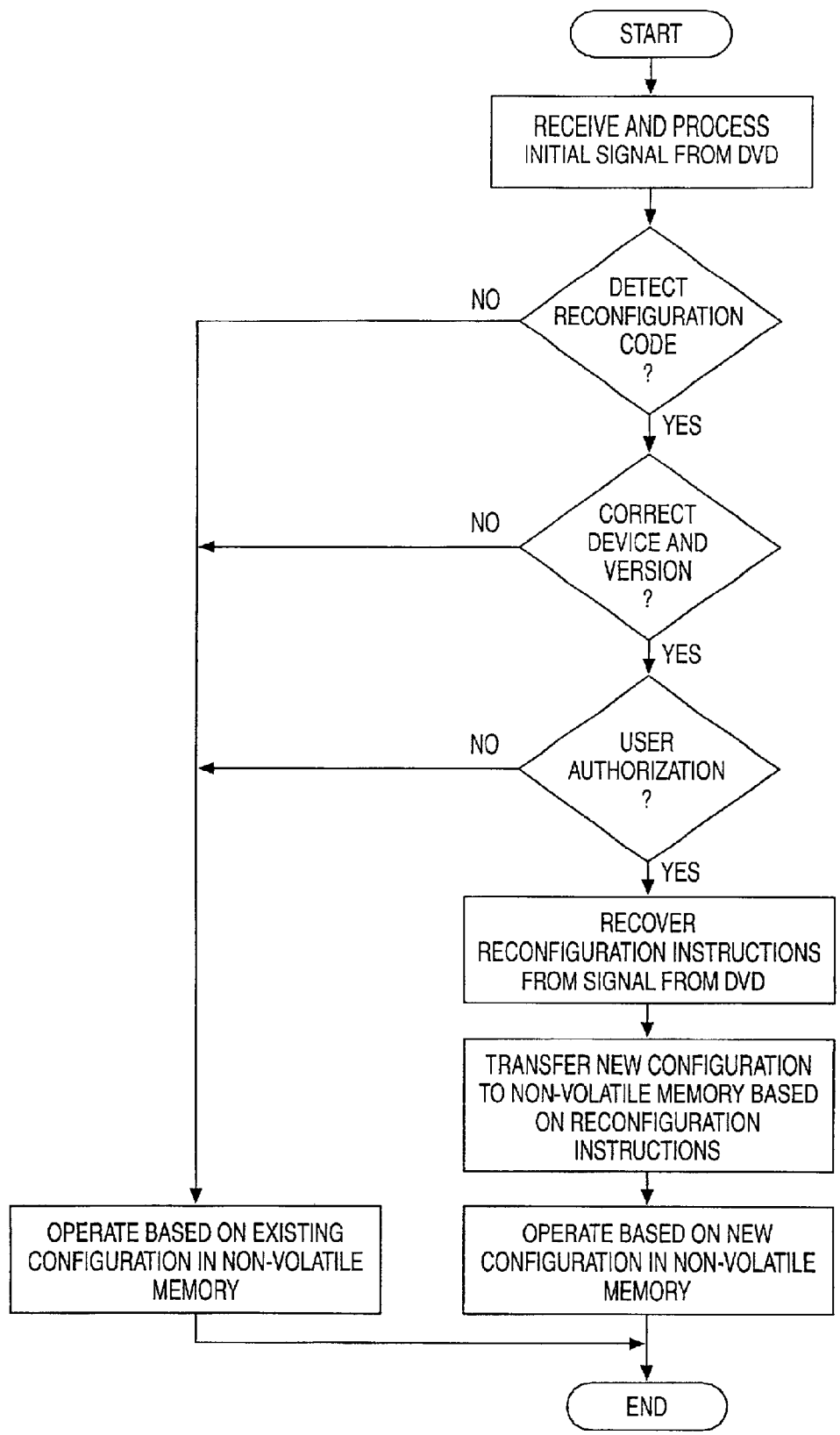
FIG. 4 is a flow diagram that illustrates DVD device operation in an example of the invention.

Processing System Operation—FIG. 4

FIG. 4 is a flow diagram that illustrates processing system 120 operation in an example of the invention. The operation starts when processing system, 120 receives the initial DVD signal 115 from disk reader 110. The initial DVD signal 115 is the first signal generated when a DVD is inserted into DVD reader 110 and played.

Processing system 120 processes the initial DVD signal 115 to detect any reconfiguration code. If no reconfiguration code is detected, then processing system 120 continues to operate based on its existing configuration. If a reconfiguration code is detected, then the device identifier and configuration version indicated by the reconfiguration code are checked to determine if DVD device 100 should be reconfigured. If the device identifier includes DVD device 100, and if the version identifier indicates a new version, then processing system 120 obtains the user authorization, such as a user password. If the user authorization is obtained, then processing system 100 processes DVD signal 100 to recover the reconfiguration instructions. If not, then processing system 120 continues to operate based on its existing configuration.

Based on the reconfiguration instructions, processing system 120 transfers a new configuration to non-volatile memory 130 for storage. Processing system 120 then operates based on the new configuration. The new configuration might include operating parameters for new algorithms or interfaces.

FIGS. 1–4 and the above description depict a specific example of a DVD device in accord with the present invention. Those skilled in the art will appreciate that some conventional aspects of the DVD device have been simplified or omitted for clarity. Those skilled in the art will appreciate that the features described above could be combined in various ways to form multiple variations of the invention. Those skilled in the art will also appreciate variations of the DVD device that fall within the scope of the invention. As a result, the invention is not limited to the specific example described above, but only by the following claims and their equivalents.

What is claimed is:

1. A method of operating a digital video disk device that has a non-volatile memory that stores a first configuration, the method comprising:

processing a signal from a digital video disk;

detecting a reconfiguration code in the signal if the reconfiguration code is stored on the digital video disk;

operating the digital video disk device based on the first configuration if the reconfiguration code is not detected;

processing reconfiguration instructions from the signal if the reconfiguration code is detected;

storing a second configuration in the non-volatile memory based on the reconfiguration instructions; and operating the digital video disk device based on the second configuration in response to storing the second configuration in the non-volatile memory.

2. The method of claim 1 wherein operating the digital video disk device based on the second configuration comprises using a different decoding algorithm from the first configuration.

3. The method of claim 1 wherein operating the digital video disk device based on the second configuration comprises using a different communication interface from the first configuration.

4. The method of claim 1 wherein operating the digital video disk device based on the second configuration comprises using a different user interface from the first configuration.

5. The method of claim 1 wherein operating the digital video disk device based on the second configuration comprises fixing a design defect in the first configuration.

6. The method of claim 1 wherein detecting the reconfiguration code comprises detecting a device identifier for the second configuration and wherein storing the second configuration in the non-volatile memory comprises storing the second configuration in the non-volatile memory if the device identifier includes the digital video disk device.

7. The method of claim 1 wherein detecting the reconfiguration code comprises detecting a version identifier for the second configuration and wherein storing the second configuration in the non-volatile memory comprises storing the second configuration in the non-volatile memory if the version identifier does not include the first configuration.

8. The method of claim 1 further comprising, in response to detecting the reconfiguration code, obtaining a user authorization for reconfiguration.

9. The method of claim 8 wherein obtaining the user authorization comprises obtaining a user password.

10. The method of claim 1 wherein storing the second configuration in the non-volatile memory comprises storing the second configuration in a flash read only memory.

11. A digital video disk device comprising:

a non-volatile memory configured to store a first configuration and to store a second configuration; and a processing system configured to process a signal from a digital video disk, detect a reconfiguration code in the signal if the reconfiguration code is stored on the digital video disk, operate based on the first configuration if the reconfiguration code is not detected, process reconfiguration instructions from the signal if the reconfiguration code is detected, transfer the second configuration to the non-volatile memory based on the reconfiguration instructions, and operate based on the second configuration in response to the second configuration being stored in the non-volatile memory.

12. The digital video disk device of claim 11 wherein the second configuration comprises a different decoding algorithm than the first configuration.

13. The digital video disk device of claim 11 wherein the second configuration comprises a different communication interface than the first configuration.

14. The digital video disk device of claim 11 wherein the second configuration comprises a different user interface than the first configuration.

15. The digital video disk device of claim 11 wherein the second configuration comprises design defect fix for the first configuration.

16. The digital video disk device of claim 11 wherein the reconfiguration code comprises a device identifier for the second configuration and the processing system is configured to transfer the second configuration to the non-volatile memory if the device identifier includes the digital video disk device.

17. The digital video disk device of claim 11 wherein the reconfiguration code comprises a version identifier for the second configuration and the processing system is configured to transfer the second configuration to the non-volatile memory if the version identifier does include the first configuration.

18. The digital video disk device of claim 11 wherein the processing system is configured to obtain a user authorization for reconfiguration in response to detecting the reconfiguration code.

19. The digital video disk device of claim 18 wherein the user authorization comprises a user password.

20. The digital video disk device of claim 11 wherein the non-volatile memory comprises a flash read only memory.

* * * * *